Jan. 16, 1940.  W. E. URSCHEL  2,187,252
DICING MACHINE
Filed Aug. 25, 1937  4 Sheets-Sheet 2

INVENTOR.
William E. Urschel
BY:- Cox & Moore
ATTORNEYS.

Jan. 16, 1940.  W. E. URSCHEL  2,187,252
DICING MACHINE
Filed Aug. 25, 1937  4 Sheets-Sheet 3

INVENTOR.
William E. Urschel
BY: Cox & Moore
ATTORNEYS.

Jan. 16, 1940. W. E. URSCHEL 2,187,252
DICING MACHINE
Filed Aug. 25, 1937 4 Sheets-Sheet 4

INVENTOR.
William E. Urschel
BY Cox & Moore
ATTORNEYS.

Patented Jan. 16, 1940

2,187,252

UNITED STATES PATENT OFFICE 2,187,252

DICING MACHINE

William E. Urschel, Valparaiso, Ind.

Application August 25, 1937, Serial No. 160,868

15 Claims. (Cl. 146—78)

The present invention relates to a slicing machine and more particularly to a device for producing diced pieces of fruit and vegetable material.

It is an object of this invention to provide a new and improved dicing machine which is simple in operation and which will dice fruits and vegetables of varied shape and form without wastage.

An additional object of this present invention is to provide a dicing machine suitable for cutting fruits and vegetables into cube-shaped particles by a series of slicing operations which cooperate in such a manner that the substance being sliced is properly positioned for presentation to the cutters at each step in the process and is severed or subdivided by blades motivated in slicing relationship.

A further object of the present invention is to provide a novel slicing means for a dicing machine having a rotatably mounted hopper which conveys the substance fed to the machine rotatably across a slicing table in cutting relationship to a blade thereon.

Yet an additional object of the present invention is to provide an improved arrangement of slicers and cutters in combination for successively reducing the substance to relatively small diced portions in a novel manner.

Another object of the invention is to provide a novel combination of roller cutters arranged adjacent a series or gang of cutting blades in such a manner that the cutters, while slicing transversely through the material which is being diced, force and present the sliced pieces directly into cutting relationship with the blades, thereby eliminating extensive intermediate handling and positioning of the pieces.

Other objects of the present invention are to provide a dicing machine wherein the pieces sliced or cut are maintained against curling or distortion during the slicing operations which would tend to interfere with the symmetry of the final particles; to provide an improved hopper for feeding the vegetables or fruits to be diced into the initial slicing step, which is capable of handling a multiplicity of substance units and successively presenting these to the slicing blade; to provide a casing in combination with a gang of cutting blades having means thereon to positively force the pieces to be cut to a position inwardly remote from the edge thereof whereby to assure complete severing.

Yet other and further objects and advantages will be apparent from a consideration of the following detailed description when taken in connection with the accompanying drawings, wherein.

The present dicing machine shown in the drawings for purposes of illustrating the invention comprises a frame composed of side angle members 10 and 11, respectively, joined at the ends by the transverse angle members 12 and 13. Corner brackets 14 are rigidly secured to the angle frame members at the corners and are provided with apertures in their lower portions to accommodate the four tubular legs 15 which support the device. Each of the legs is secured in the aperture in the corresponding corner bracket 14 by means of a set screw (not shown), the loosening of which permits longitudinal adjustment of the leg so that the entire device may be variably adjusted with respect to the floor.

Figures 1, 13:
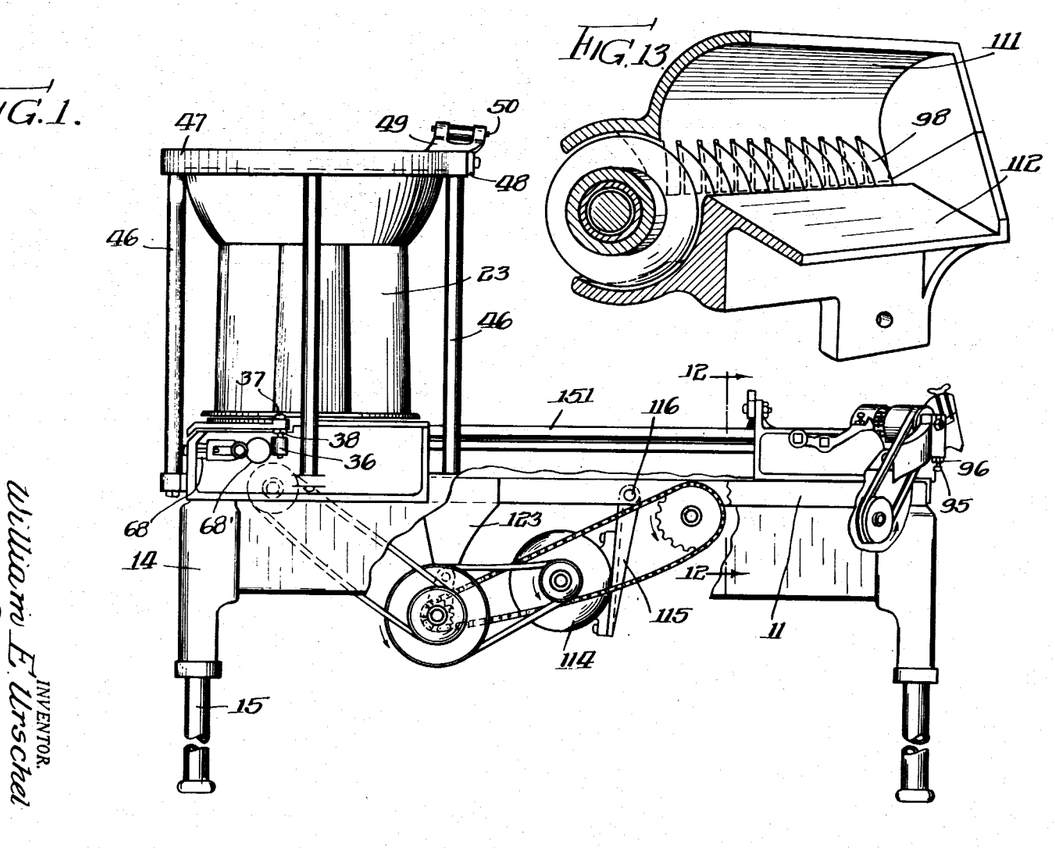
Fig. 1 is a side elevational view of a dicing machine constructed in accordance with the present invention.
Fig. 13 is a perspective detail view of the final gang of cutting knives and the surrounding casing.
Figures 2, 3:
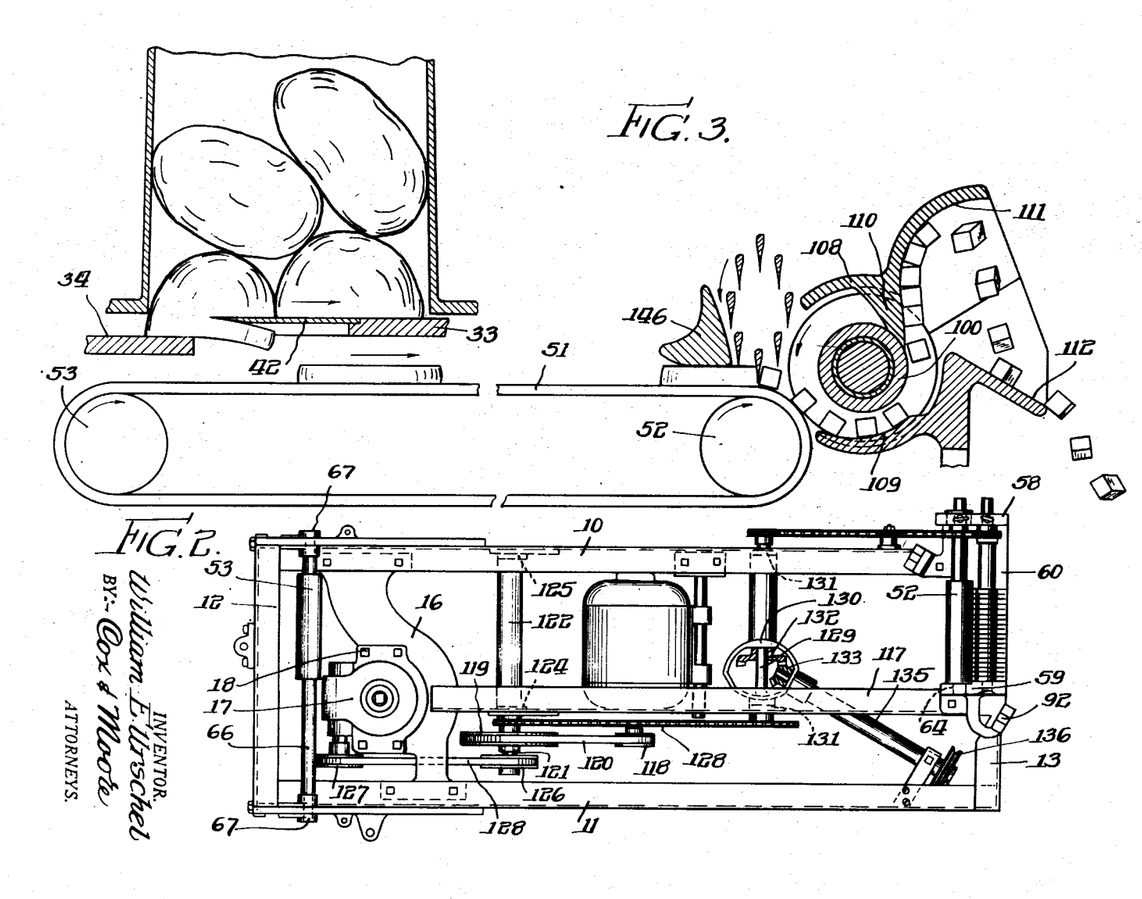
Fig. 2 is a plan view of the machine shown in Fig. 1, the slicing table, certain top portions having been removed.
Fig. 3 is a more or less diagrammatic sectional elevation taken transversely through the slicing means and indicating their cooperative action.
Figures 4, 5, 6, 9, 10, 11, 14:
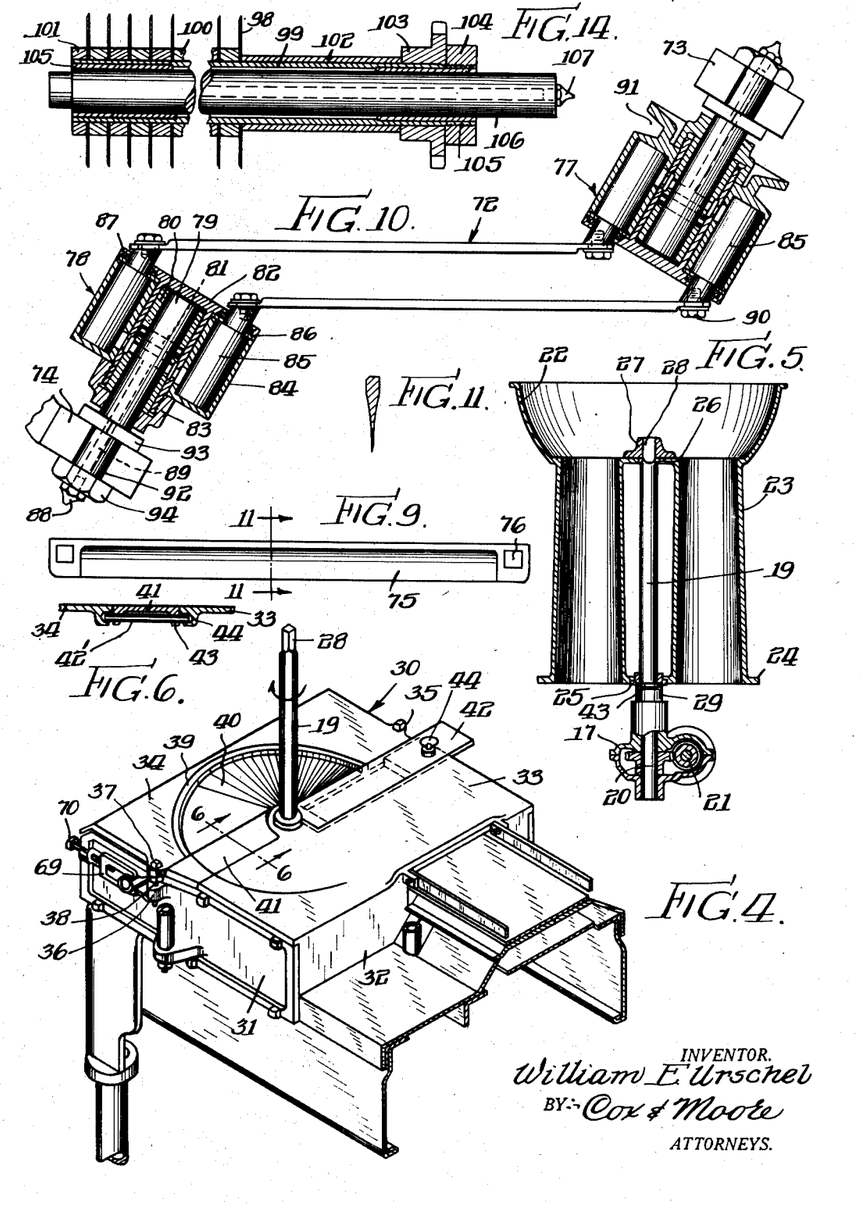
Fig. 4 is a perspective detail view of the left-hand portion of the machine shown in Fig. 1, certain portions having been removed to show the details thereof.
Fig. 5 is a sectional elevation taken centrally through the feed hopper.
Fig. 6 is a partial detail sectional elevation taken on the line 6—6 in Fig. 4.
Fig. 9 is a side elevation of one of the cutting knives.
Fig. 10 is a detail sectional plan view of the traveling knife assembly.
Fig. 11 is a section taken on the line 11—11 of Fig. 9.
Fig. 14 is a detail sectional elevation taken through the gang of final cutting knives.

The transverse frame member 16 is rigidly bolted between the longitudinal frame members 10 and 11 and has a curved configuration, as is clearly shown in Fig. 2, to support the gear housing 17, which is in turn rigidly fastened thereto by means of the bolts 18. The housing 17, as more clearly shown in Fig. 5, supports the hopper drive shaft 19 for rotation about its longitudinal axis, and drive means is provided for rotating the shaft, comprising worm gearing 20 driven from the transversely extending shaft 21. The feed hopper, as indicated more clearly in Figs. 1 and 5, consists of an upper bowl-like portion 22 having a generally flat bottom portion perforated by a plurality of annularly arranged apertures which communicate with a series of vertically extending tubular members 23. It will be noted that the tubular members are spaced radially from the vertical axis of the hopper and are tapered slightly so that they are of slightly increased diameter adjacent their bottom extremities whereby to permit ready passage of any fruit or vegetables which may be caused to enter into their top ends. A circular plate 24 joins and positions the tapered tubes 23 adjacent their lower ends. A collar 25 is in turn rigidly fixed in the exact center of the plate 24, while the center of the bottom of the bowl portion 22 is provided with a corresponding central aperture 26 over which is co-axially mounted a hub member 27 secured thereto by welding or the like. The hub member 27 is provided with a squared bore adapted to fit over the square end 28 of the hopper shaft 19. Accordingly, it will be apparent that the hopper may be readily removed from the shaft 19 for various reasons and may be readily repositioned, as shown in Fig. 5, at which time it will be associated with the shaft 19 so as to be positively driven when the said shaft is rotated. The weight of the hopper will be supported upon the upwardly projecting bearing portions 29 of the gear housing 17 at all times during operation.

Just below the rotatable hopper is positioned a slicing table 30 in cooperative relationship thereto, said table being spaced from the frame by vertically extending side plates 31 and end walls 32. The forward portion 33 of the top surface of the table is rigidly fixed with respect to the vertical walls 31 and 32 and the frame of the machine. The portion 34 located on the rear of the said slicing surface, as viewed in Fig. 4, is mounted for limited vertical adjustment with respect thereto and to this end is provided with opposite side lugs 35 which cooperate with bosses 36 on the vertically extending side plates 31 having cap screws 37 threaded therein. Lock nuts 38 on the screws 37 accordingly permit vertical adjustment of the table section 34 with respect to the table section 33 and in accordance with the will of the operator.

An annular upstanding wall 39 on the portion 34 of the slicing table coincides generally with the periphery of the circular plate 24 of the hopper when in operative position. Radially between the wall 39 and the hopper drive shaft 19 is provided a surface 40 which inclines gradually downwardly in a clockwise direction about the shaft 19. The plate 41, interposed between the two sections 33 and 34 of the slicing table, is supported by a pair of bars or rods 42' passing through downwardly projecting marginal flange portions 43, as shown in Fig. 6. The projecting extremities of the rods 42' fit relatively loosely in recessed embossments 44 in the adjacent plates 33 and 34, as a result of which the upper surface of the plate 41 tends to preserve the continuity between the aforementioned portions regardless of the extent of vertical adjustment of the portion 34. In other words, as the portion 34 of the slicing table is adjusted upwardly, the plate 41 will tilt accordingly.

The knife blade 42 is seated flush with the top portion 33 in a suitable pair of grooves, with its innermost end abutting into the slot 43 formed in the upwardly extending sleeve portion 29 of the gear housing 17, as shown in Fig. 5. The knife blade 42 is maintained in place by the thumb screw 44 and may be readily removed for cleaning by removing the thumb screw and sliding the blade endwise out of the slot 43.

It will be readily apparent from the diagrammatic showing in Fig. 3, that the blade 42, being in juxtaposition with the lowermost portion of the inclined annular surface 40, is in a position to sever a substance conveyed along the said surface and transversely to the edge of the knife. Accordingly when the hopper is rotated and supplied with vegetables, for example, the portions projecting from the bottom of the hopper and supported upon the surface 40 will be conveyed across the knife edge and uniformly sliced, as indicated in Fig. 3.

The thickness of the slices may be accurately determined by adjustment of the portion 34 of the slicing table through the agency of the cap screws and lock nuts 37 and 38, respectively. Since the surface along which the substance to be sliced is relatively continuous and uniform, at all points spaced annularly from the edge of the blade, it will be apparent that the flat surface, of the substance remaining in the hopper, produced by the preceding contact with the knife blade, will remain in flatwise registry therewith and will be presented to the edge of the knife in such fashion that the next succeeding slice will have a uniform thickness throughout.

The present device also comprises a guide and guard means co-acting with the hopper. This guard means comprises four vertically extending posts 46 suitably supported upon brackets, lugs or embossments provided on the table supports and frame members and bar at their upper end, the annular guard ring 47 enclosing the edge of the hopper bowl 22. A bracket 48 bolted to the guard ring 47 supports an arm 49 pivotally mounted upon the said bracket by the pin 50. The arm 49 projects downwardly into the bowl of the hopper in its normal direction of rotation and serves to divert the fruit into the tubular guide portions 23 thereof. Accordingly fruit or vegetables, for example, dumped into the bowl portion 22, will be guided into the spaced annularly arranged tubular guides 23 as the hopper rotates. The pieces thus conveyed to the bottom portion of the tubular guides will be supported upon the surface of the slicing table and, as rotation progresses, will be gradually lowered down the inclined surface 40 and impinged across the edge of the blade 42 so that a slice will be removed therefrom transversely in the direction of movement. This action is repeated untill all the material is uniformly sliced.

Figure 7:
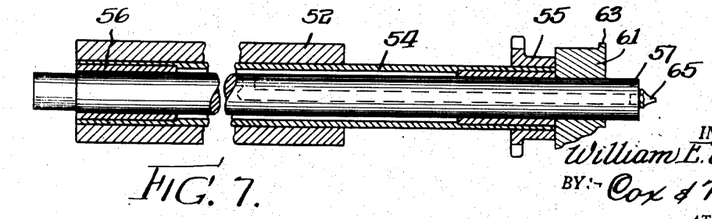
Fig. 7 is a sectional detail elevation taken centrally through one of the conveyor pulleys to show its internal construction.

The slices so produced fall downwardly and are caught upon a moving endless belt 51 mounted upon pulleys 52 and 53. The pulley 52 (shown in detail in Figs. 2 and 7) is mounted rigidly upon a sleeve 54 as by being driven forcefully thereover. The sleeve has affixed adjacent one end thereof a sprocket member 55 by means of which the belt is continually driven. Bearings 56, inserted under force into either end of the sleeve 54, are mounted rotatably upon the fixed shaft 57. The whole assembly is supported in opposed vertical upright portions 58 and 59 of the bracket or sprocket 60, which is bolted to the right-hand end of the frame of the machine, as viewed in Fig. 2. The collar 61 secured to the shaft 57 adjacent one end by means of a set screw (not shown) slides into the relatively large aperture 62 formed in the upright member 58, being positioned axially by the shoulder 63 and the thumb screw 64. The opposite end of the shaft 57 is supported in an aperture 64 on the opposite vertical 59. It will thus be seen that the shaft 57 is normally fixed with respect to the uprights 58 and 59 but may be readily removed by loosening the thumb screw 64. In accordance with the present invention it is intended that the collar 61 and the mating aperture 62 be of sufficient size to permit the passage of the pulley 52, thus facilitating removal thereof and adjustment or replacement of the conveyor belt. A grease gun fitting 65 communicates with a suitable duct in order to provide for the lubrication of the bearings.

The opposed belt supporting roller 53 is rigidly secured to a shaft 66 which is journaled for free rotation in the take-up bearings 67. As shown in Figs. 1 and 4, the bearings 67 are slidably mounted in slots 68 formed in vertically extending side plates 31 for horizontal reciprocation. Moreover the bearings or journals 67 are provided with yoke-like extensions 69 threaded to accommodate the cap screws 70, which in turn pass through a suitable embossed portion of the vertical side plates 31. Thus it will be apparent that the position of the bearings 67 and accordingly the roller 53 may be adjusted with respect to the slots 68 by relative movement of the cap screws 70 in order to vary the tension and alinement of the conveyor belt as desired. Moreover the circular aperture 68′, communicating with the horizontal slot 68, is of sufficient size to permit removal of the roller when the cap screws 38 are completely released from the yoke member 68.

The slices falling upon the endless belt 51 are conveyed in the direction indicated by the arrow in Fig. 3 until they are brought in contact with the roller knife assembly 72, which is mounted upon brackets 73 and 74, which are an integral part of the casting 60, aforementioned. The roller knives employed in accordance with the invention are the same general type as those disclosed in my copending application, Serial No. 11,229, filed March 15, 1935, and comprise a plurality of blades 75 arranged generally transversely of the endless conveyor belt 51 and adapted to be rotated in a closed curve path so as to further sever the material transversely and to move with it while it is being conveyed upon the belt. The knife blades 75, as shown in detail in Figs. 9 and 11, are preferably hollow ground and provided at each extremity with a squared aperture 76 for attachment to the supporting heads 77 and 78. Each of these said last named members is rotatably mounted on a stud shaft or pin 79 fixedly secured in the respective brackets 73 and 74. Bearing sleeves 80 of antifriction material are secured to the shaft 79 through the agency of transversely extending pins 81 and position the supporting heads 77 and 78 for rotation therewith. Each of the supporting heads comprises a hubbed plate 82 threaded at its inner extremity to accommodate the locking sleeve 83, which in turn holds in place the annular pin supporting section 84.

A plurality of pins 85, eight in accordance with the present embodiment, are arranged in spaced order in recesses formed in the annular member 84 of each supporting head and adapted for free rotational movement therein. Each of the pins 85 is provided with a reduced extremity which passes through the plate 86, the adjacent shoulder on the pin serving to position the pins axially.

Plates 86 also secure the lubricant retaining washers 87 about the reduced extremities of the pins. Pressure gun fittings 88 and the ducts represented by the dotted lines 89 provide lubricant for the relatively moving parts. The aforementioned knives 75 are each rigidly fastened to the respective reduced extremities of opposed pins 85 by means of cap screws 90 having squared shoulders fitting securely with the squared apertures 86 and the knife blades. Accordingly the blades are always fixed relatively with respect to the pins 85 to which they are attached. Thus they are always throughout their movement pointed in a downward direction. The two supporting heads 77 and 78 are substantially identical in construction with the exception that the former is provided with an integral V-groove 91 for accommodation of a drive pulley, the actuation of which will be described more in detail hereinafter.

The pins or stub shafts 79 are mounted in vertically extending slots 92 in the respective supporting brackets 73 and 74 and are positioned axially by means of integral flanges 93 and 94. Vertical adjustment and alinement is permitted through the agency of cap screws 95, as shown in Fig. 1, extending upwardly through the brackets and adapted to contact the lower portion of the shaft. Lock nuts 96 are provided to permit control and maintenance of the adjustment.

Attention is directed to the fact that due to the annular positioning of the bearing supports and the rotational mounting of the pins with respect thereto, the knives when moved under the influence of the rotation produced by the aforementioned drive belt will have three different components of motion with respect to the material to be severed. As viewed in Fig. 10 the knives will be moved in a closed continuous path of rotation during which they are successively caused to approach and retract from the surface of the endless belt 51. At the same time, while being reciprocated in the vicinity of the conveyor, they will move in the general direction thereof, preferably at substantially the same speed of movement so that the substance being severed will not be hindered in its normal forward movement. Furthermore, it will be noted that the normal movement of the knives comprises motion transversely of the direction of the said direction of movement of the conveyor, as the result of which the severing takes place with a transverse slicing action. Accordingly the action of the roller cutter is not merely to force a knife into and out of the slices of substance brought into its sphere of action, but, on the contrary, the pieces are severed by a downward movement of the blades coupled with a transverse slicing action, which takes place without interfering with the normal advancement of the pieces. In other words the action of the knife is similar to the normal manual slicing operation.

The strips of substance severed by the roller knives immediately come in contact with a gang of disk knives 98, shown in Figs. 2, 3, 8, 13 and 14. The knife blades 98 are arranged in parallel planes and closely adjacent the roller knives so that the substance, while under the influence thereof, will be forced directly thereinto. The cylindrical tube 99 supports the circular blades 98, which are separated by the annular spacers 100. The end spacer 101 is welded to the sleeve 99 and after assembly of the blades and spacers thereof, an outer sleeve 102 is placed thereover and the sprocket 103 is placed in axial abutment therewith and the whole assembly maintained in position by the nut 104. Bearings 105 are forcibly maintained interiorally of the extremities of the tube 99 and support the gang of blades rotatably upon the fixed shaft 106. A grease gun fitting 107 communicates with a suitable duct to supply lubricant to the bearings. The shaft 106 is supported at its extremities in the upstanding portions 58 and 59 of the end casting 60 being situated in suitable apertures therein and axially positioned by means of the thumb screw 113.

A casing 108 surrounds the gang of cutter blades and is provided intermediate of each of the blades with a radially inwardly extending cam surface 109. As a result of this structure it is impossible for the diced pieces to be imperfectly or only partially severed during the final operation, since, when brought into contact with the surface 109, they are forced radially inwardly of the edge of the blades. The cubes thus caught or wedged between adjacent blades are carried upwardly under the influence of the rotation thereof until they impinge the inwardly extending finger portions 110 which extend between the blades and substantially to the annular spacer members 100. At this point the diced pieces are released from the blades and forced upwardly and outwardly to clear the outer edges of the knives. The reverse curvature on the hooded portion 111 of the casing causes the cubes to fall downwardly clear of the blades into the chute-like portion 112, from whence the final product is conveyed to suitable containers.

The motor 114 and the main driving mechanism are bolted to the base plate 115, which is in turn pivoted about the shaft 116 supported at its ends in the frame member 10 and in a further longitudinally extending frame member 117, which is bolted to the transverse member 16. A V-grooved pulley 118 fastened to the motor drive shaft is operatively connected to the V-grooved pulley 119 through the agency of the drive belt 120 for rotating the intermediate drive shaft 121. The drive shaft 121 is journaled in the tubular housing 122, which in turn is pivotally mounted with respect to the frame through the agency of integral upwardly extending lugs 124 and 125 bolted to the downwardly projecting supports 123 riveted to the frame members. The V-grooved pulley 126, keyed to the shaft 121, drives the pulley 127, by means of the belt 128 for rotating the aforementioned shaft 21 which is connected to rotate the hopper in the manner hereinbefore described in detail.

A suitable chain sprocket 128 actuated by a suitable sprocket, also keyed to the shaft 121, actuates the shaft 129 journaled in the gear housing 130. This housing is provided with upwardly extending lugs 131 which are bolted to the frame members 10 and 117 in such a manner as to pivotally support the assembly. A bevel gear 132, keyed to the shaft 129, drives the associated bevel pinion 133 and accordingly the shaft 134 which is rotatably mounted in the extended hub 135 of the housing 130. A V-grooved pulley 136, pinned to the end of the shaft 134, drives the supporting head 77 of the roller knife assembly through the agency of a V-drive belt 137, as clearly shown in Fig. 8.

Figure 8:
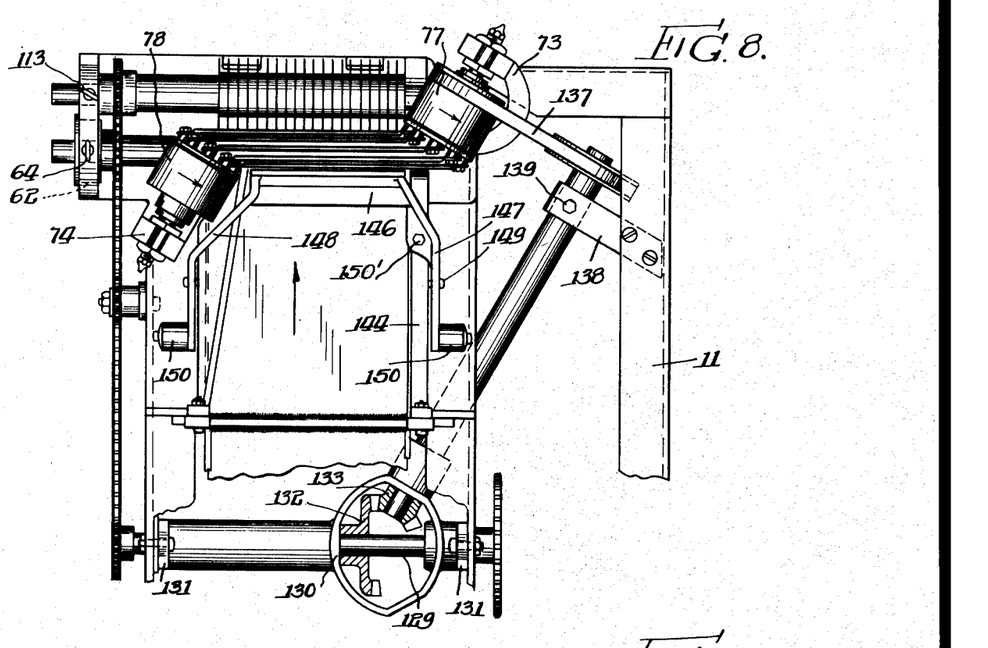
Fig. 8 is a detail plan view of the right-hand end of the machine as shown in Fig. 1.

Means is provided to control the tension on the belt 137 and comprises a strap 138 bolted to the frame member 11, as will be readily apparent after viewing Fig. 8, and provided with a cap screw 139 threadedly associated therewith so as to contact the upper surface of the tubular extension 135. Accordingly tightening of the cap screw 139 will cause the lower end thereof to be forcibly pressed against the extended portion 135, thus tending to force the pulley 91 to pivot about the axis of the bolts supporting the gear housing 130.

Figures 12, 15:
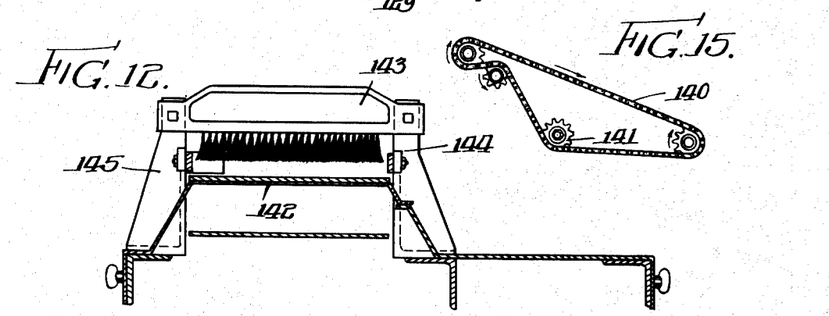
Fig. 12 is a detail sectional elevation taken on the line 12—12 of Fig. 1.
Fig. 15 is an elevational view showing the arrangement of the driving chain for rotating the disk knife and the conveyor belt.

A further chain sprocket drive 140, Figs. 2, 8 and 15, connects the other end of the shaft 129 in driving relationship to the disk knives 98 and the drive pulley 52 through the agency of sprocket wheels 103 and 55, hereinbefore described, and rigidly associated with the knives and the driving roller, respectively. An adjustable idler sprocket 141 rotatably mounted on the frame of the machine is provided for the purpose of taking up the slack in the chain and permitting accurate and proper adjustment thereof.

The upper run of the conveyor belt normally rests upon a suitable sheet support 142 (as indicated in Fig. 12) having portions which serve to enclose the driving means and to suitably position the support with respect to the frame. In order to present the initially sliced substance properly to the subsequent cutting operations, a brush 143 is secured to the upwardly extending support members 144 and 145 which are positioned upon the longitudinally extending frame members 117 and 11, respectively. The lower extremities of the bristles are positioned at a height above the upper run of the belt 51, substantially equal to the thickness of the slices severed by the knife 42. Accordingly, if by chance slices should become superimposed, the upper slice will be retarded and caused to drop down upon the surface of the conveyor belt so that only one layer of slices is brought into the vicinity of the roller knives.

Additional provision is made to guard against the slices being caused to warp or tip upwardly as they are sliced by the roller knives and comprises a guide member 146, as shown in Figs. 3 and 8, having at either end thereof rearwardly extending arms 147 and 148, each of said arms being pivotally mounted intermediate of its ends upon the aforementioned upright supports 144 and 145 by the pivots 149. Counterweights 150 secured to the opposite ends of the arms 147 and 148 serve to counterbalance the weight of the guide member 146. The guide member may be accurately spaced from the conveying belt 51 by means of the cap screw 150 threadedly supported in a suitable flange on the arm 147 and adapted to contact the upper edge of the upright support 144. The cap screw 150 may thus be adjusted in order to position the guide member 146 in accordance with the particular thickness of the slices being supplied thereto and since it is of relatively considerable weight, will maintain the said slices in the position shown in Fig. 3 while being positioned to the cutter blades.

Guide members 151, bolted at opposite ends to the upright supports 144 and 145 on the slicing table, are provided to retain the substance upon the belt against any possibility of being displaced therefrom.

The machine is set in operation by actuating the motor 114, whereupon the feed hopper is rotated relatively to the slicing table and the conveyor belt 51 commences to move forwardly while the gang of cutter blades 98 and the roller cutters are likewise set in motion. Fruit or vegetables dumped into the bowl-shaped top portion of the hopper are conveyed across the slicing blade in the manner aforementioned, with the result that slices of uniform thickness are successively cut therefrom and deposited upon the conveyor 51. After passing under the brush 143, the slices are fed into the roller cutters where, while moving at the same rate, they are sliced transversely into strips having a square cross section, and then immediately presented to the gang of cutter blades 98 which finally cause severing into particles of cubic shape.

The present invention provides a dicing machine which is simple in structure and which operates quickly and efficiently to dice fruits and vegetables without any appreciable waste. Moreover the present device provides diced pieces which are symmetrical, uniform and pleasing in configuration, since at each step in the processing thereof the pieces of substance are presented to the blades in proper relationship and while being so held and acted upon that substantially perfect slicing takes place. Thus the action of the initial slicing knife 42 is to slice the substance repeatedly in planes which are in substantially perfect parallelism. Subsequently these initial slices are presented to the roller cutters while being maintained in a flat plane. The cutter blades, moreover, are presented exactly transversely to the direction of movement of the substance and are actuated with a slicing movement as compared with a mere chopping action. The component of movement of the roller cutting blades in the direction of advance of the substance upon the belt 51 is utilized to force the severed strips directly into the cutter blades 98. Thus the final cutting step, which so often has presented extreme difficulties due to the desirability of forming relatively small diced particles, is obviated there being no opportunity for the pieces to become disarranged from the proper predetermined relationship with respect to the final cutters.

Changes may be made in the form, construction and arrangement of the parts without departing from the spirit of the invention or sacrificing any of its attendant advantages, and the right is hereby reserved to make all such changes as fairly fall within the scope of the following claims.

The invention is hereby claimed as follows:

1. A dicing machine comprising a generally horizontal table having a blade fixedly arranged thereon for cutting substance passed across said table, a hopper above said blade, said hopper being mounted for rotational movement about a predetermined axis upstanding from said table, a plurality of tubular guide members adapted to accommodate and guide the substance to be sliced, said guide members being substantially parallel to said axis and offset radially therefrom and having their bottoms lying slightly above the plane of the edge of said blade, said hopper being arranged adjacent the inlet sides of said guide tubes and communicating therewith, and a pivoted arm extending into said hopper for directing substance into the rotating guide tubes.

2. In a dicing machine, means for conveying sliced substance in a predetermined path, a cutting blade extending generally transversely of said path while being arranged substantially parallel to the conveyor, means to move said blade substantially longitudinally whereby said blade moves transversely of the path in slicing relationship to said substance to sever the substance into transverse strips, means coincidentally to move the blade substantially in said first named path to force the substance being cut forwardly in said path, and a gang of cutters mounted forwardly of the said blade whereby the gang of cutters are fed positively by the action of said blade.

3. In a dicing machine, means for conveying sliced substance in a given path, a cutting blade arranged at an angle to said path, means to reciprocate the blade transversely of said substance in slicing relationship to sever the substance into transverse strips while moving in said path and means coincidentally to move the blade in the direction of said first named path while it is severing the substance in order to force the substance being cut forwardly, and a gang of parallel rotatable cutters mounted in the path of the strips fed by the blade and operable generally parallel with said path whereby the rotatable cutters are fed positively by the action of said blades.

4. In a dicing machine, means for conveying sliced substance in a given path, a cutting blade arranged at an angle to said path, means to reciprocate the blade transversely of said substance in slicing relationship while moving in said path, means coincidentally to move the blade in the direction of said first named path while it is severing the substance in order to force the substance being cut forwardly, a gang of parallel rotatable cutters operable generally parallel with said path whereby the rotatable cutters are fed positively by the action of said blades, and a weighted guide member arranged adjacent the feed side of said blade to maintain the substance being presented to the blade in flat relationship, said guide member being mounted on a pair of arms pivoted about a remote point and being held against the substance by its own weight.

5. In a dicing machine, conveyor means to convey sliced substance to be diced in a predetermined path, transverse cutting means extending transversely of the path and substantially parallel to the conveyor, said cutting means being operable longitudinally across said path to sever the substance into transverse strips, a gang of rotatable cutting blades arranged normally thereto to dice said strips, means to move the transverse cutting means to force the transverse slices into said gang of blades, said gang of blades being adapted to engage the severed pieces therebetween, and cam means associated with said blades and extending between said blades to force the pieces cut thereby inwardly of the periphery of the blades whereby to produce complete severance.

6. A dicing machine comprising a cutting blade and a hopper mounted above said blade and adapted to convey substance relatively thereto for slicing, said hopper being mounted for rotational movement about a predetermined axis and comprising a plurality of tubular guide members for accommodating the substance to be sliced, the lower ends of said tubular guide members being open to convey substance guided thereby across the slicing table, said hopper comprising a common feed chamber adjacent the upper portion of said guide members communicating with each of said guide members for feeding substance thereto, means to rotate the hopper, and a guide member mounted on a fixed pivot and extending into the hopper from a point adjacent the periphery thereof to a point relatively near the central portion of the hopper for contacting material in the hopper as the hopper rotates and directing the said material into one or more of the guide members.

7. A dicing machine comprising a cutting blade and a hopper mounted above said blade and adapted to convey substance relatively thereto for slicing, said hopper being mounted for rotational movement about a predetermined axis and comprising a plurality of tubular guide members spaced radially from said axis for movement in an annular path and having their bottom portions spaced slightly from the blade, a chamber rigidly secured to the guide members adjacent the upper ends thereof and adapted to receive the substance to be sliced, said chamber being relatively large and extending above all of said guide members, said chamber having apertures opening into each of said tubular guide members, and means to rotate the entire hopper assembly to slice the substance fed to the hopper.

8. A dicing machine comprising a slicing table, said table having two separate sections, one section being fixed and the other section being movable with respect to the plane of said fixed section, said sections comprising an annular surface adapted to support substance for slicing, one of said sections providing an inclined portion of said annular surface, a cutting blade fixed to said table adjacent the foot of said inclined surface but elevated therefrom to cause slicing of material forced down said surface, an upper edge of said inclined section residing opposite and adjacent the edge of said fixed section in said annular path and being adjustable with respect thereto, said edges extending substantially parallel to said cutting blade, and means to move the relatively movable section with respect to the fixed section to adjust the distance between the knife.

9. A dicing machine comprising a slicing table, said table having an annular, inclined surface thereon, a cutting blade fixed to said table adjacent the foot of said inclined surface but elevated therefrom whereby to cause slicing of material forced along said surface, said table and surface being divided into two sections, one section being relatively movable with respect to the plane of the other section, a ramp between the sections at a point spaced from the blade and pivotally associated with each of the sections to provide a continuous path for the substance irrespective of the relative elevation of the two sections, and means to relatively adjust the said movable section for determining the thickness of the slice to be severed.

10. A dicing machine comprising a slicing table, said table having an annular surface for supporting substance to be sliced, said table and said annular surface being divided into two sections, one of said sections being adapted to be relatively vertically adjusted with respect to the plane of the other section, said sections providing pairs of adjacent edges in said annular surface, the edges of said relatively movable section being relatively movable under the influence of the relative adjustment of the said sections, a knife blade on one of the edges of said pairs for slicing material moved relatively thereto, and an intermediate section operatively positioned between the edges of the other said pair and adapted to pivot with respect to each edge when relative vertical adjustment is made to provide a ramp for conveying the material to be diced from one section to the other regardless of the relative elevations of the sections.

11. A dicing machine comprising a slicing table, a hopper mounted above the slicing table and comprising a plurality of tubular guide members for accommodating the substance to be sliced, a funnel-shaped chamber secured adjacent the upper portions of said tubular guide members for supplying substance thereto, means to rotate the entire hopper assembly about a central axis, and means fixed with respect to the slicing table extending upwardly and having mounted thereto an annular guide ring engaging about the funnel-shaped chamber for journalling the hopper for rotation.

12. A dicing machine comprising an endless belt conveyor, means to deposit slices of substance on the conveyor, means to actuate the conveyor to convey the slices in a predetermined path, a plurality of slicing knives arranged transversely of the conveyor and in the path of said slices for severing the slices transversely into a plurality of strips, and a gang of cutting blades arranged adjacent the endless belt at a point in the path subsequent to the said transversely acting knives but closely adjacent said knives to engage the strips of substance while they are still in contact with the knives, said blades being arranged parallel with said predetermined path for dividing the strips into diced pieces.

13. In a dicing machine, a substantially continuous movable conveyor having a supporting surface, means to move said conveyor in a predetermined path, means to convey sliced substance on said surface, a roller cutter comprising a plurality of blades, said cutter blades being arranged substantially parallel to said surface while extending generally transversely of said path, means to move said blades to a point coincident with said path to slice the substance transversely, said last named means being operative to move the blades during slicing in the direction of movement of said conveyor and at substantially the same speed, and a gang of cutters operatively positioned parallel to said path of movement and mounted to engage the substance after it has been transversely sliced, said conveyor blades cooperating to force the transversely severed substance into engagement with said gang of cutters, the said blade control means being operative to reciprocate the blades transversely of said substance in slicing relationship while severing said slices for facilitating the severing action.

14. In a dicing machine, a substantially continuous movable conveyor having a supporting surface, means to move said conveyor in a predetermined path, means to convey sliced substance on said surface, a roller cutter comprising a plurality of blades, said cutter blades being arranged substantially parallel to said surface while extending generally transversely of said path, means to move said blades to a point coincident with said path to slice the substance transversely, said last named means being operative to move the blades during slicing in the direction of movement of said conveyor and at substantially the same speed, and a gang of cutters operatively positioned parallel to said path of movement and mounted to engage the substance after it has been transversely sliced, said conveyor blades cooperating to force the transversely severed substance into engagement with said gang of cutters, the said blade control means supporting said blades pivotally for arrangement in a substantially fixed parallel plane at all times, said plane extending substantially transversely of said path.

15. A dicing machine comprising a slicing table, said table providing an annular substance-supporting track, a cutting blade adjacent said annular path and extending transversely thereof, said table and annular surface being divided into two individual sections along lines extending substantially in the direction of said cutting blade edge, one of said annular sections providing an inclined surface, said cutting blade being arranged opposite the foot of said inclined surface and elevated with respect thereto for cutting substance forced along said inclined surface, means operatively associated with said sections for relatively adjusting the elevation of said sections, and an intermediate ramp member interposed between said sections at a point spaced from the blade and being pivotally associated with each of said sections for providing a ramp adapted to form a continuous path from one section to the other regardless of the elevation of the sections.

WILLIAM E. URSCHEL.